United States Patent [19]

Armand et al.

[11] Patent Number: 5,883,220
[45] Date of Patent: Mar. 16, 1999

[54] REDOX COPOLYMERS AND THEIR USE IN PREPARING MIXED CONDUCTION MATERIALS

[75] Inventors: Michel Armand, Saint-Martin d'Uriage, France; Daniel Baril, Montreal - N; Yves Choquette, Sainte-Julie, both of Canada; Christophe Michot, Grenoble; Jean-Yves Sanchez, Saint-Ismier, both of France

[73] Assignees: Centre National de la Recherche Scientifique, Paris, France; Hydro-Quebec, Montreal, Canada

[21] Appl. No.: 915,790

[22] Filed: Aug. 21, 1997

Related U.S. Application Data

[63] Continuation of Ser. No. 424,540, filed as PCT/FR93/01177 Nov. 30, 1993 published as WO94/12986 Jun. 9, 1994., abandoned.

[30] Foreign Application Priority Data

Jan. 12, 1992 [FR] France .................................. 92.14475

[51] Int. Cl.$^6$ .................................................. C08G 73/10
[52] U.S. Cl. ......................... 528/322; 359/321; 359/322; 430/58; 430/59; 430/80; 430/900; 528/331; 528/342; 528/374; 528/361
[58] Field of Search ..................... 528/322, 331, 528/342, 374, 361; 359/321, 322; 430/58, 59, 80, 900

[56] References Cited

U.S. PATENT DOCUMENTS

| | | | |
|---|---|---|---|
| 3,962,182 | 6/1976 | Steele et al. | 260/47 EN |
| 4,368,319 | 1/1983 | Hocker et al. | 528/353 |
| 4,371,692 | 2/1983 | Wolfe, Jr. | 528/289 |
| 4,661,582 | 4/1987 | McCready | 528/292 |
| 4,990,413 | 2/1991 | Lee et al. | 429/191 |
| 5,021,308 | 6/1991 | Armand et al. | 429/336 |
| 5,037,712 | 8/1991 | Shackle et al. | 429/192 |
| 5,072,040 | 12/1991 | Armand | 564/82 |
| 5,104,918 | 4/1992 | Babler | 524/90 |
| 5,136,097 | 8/1992 | Armand | 568/28 |
| 5,162,177 | 11/1992 | Armand et al. | 429/336 |
| 5,260,145 | 11/1993 | Armand et al. | 429/50 |
| 5,266,429 | 11/1993 | Sorriero et al. | 430/58 |
| 5,350,646 | 9/1994 | Armand et al. | 429/312 |
| 5,393,847 | 2/1995 | Alloin et al. | 525/403 |
| 5,414,117 | 5/1995 | Armand et al. | 562/828 |
| 5,459,228 | 10/1995 | Armand et al. | 528/373 |

FOREIGN PATENT DOCUMENTS

| | | |
|---|---|---|
| 0 013 199 | 7/1980 | European Pat. Off. . |
| 0 253 713 | 1/1988 | European Pat. Off. . |
| 374 487 | 6/1990 | European Pat. Off. . |
| 2 601 017 | 1/1988 | France . |
| 2 683 524 | 5/1993 | France . |

*Primary Examiner*—Margaret W. Glass
*Attorney, Agent, or Firm*—Oblon, Spivak, McClelland, Maier & Neustadt, P.C.

[57] ABSTRACT

The copolymer described is a segmented copolymer consisting essentially of organic segments A which have a number i of reactive ends such that i is from 1 to 6 inclusive, and segments B which have a number j of reactive ends such that j is from 1 to 6 inclusive. The segments B have redox properties and each segment A is connected to at least one segment B by a group Y and vice versa, the group Y being an ether, thioether, secondary amine, tertiary amine, secondary amide, tertiary amide, imide, quarternary ammonium group, or a group having a carbon—carbon bond. The respective weighted molar mean of i and j is 2 or more. Application to electrochemical generators and electrochromic systems.

12 Claims, No Drawings

REDOX COPOLYMERS AND THEIR USE IN PREPARING MIXED CONDUCTION MATERIALS

This application is a Continuation of application Ser. No. 08/424,540, filed on Jun. 1, 1995, now abandoned, which was filed as International Application No. PCT/FR93/01177, filed on Nov. 30, 1993.

The present invention concerns copolymers and their use for the preparation of mixed conduction materials.

Polymeric electrolytes obtained by dissolving a salt in a solvating polymer containing heteroatoms are well known. Such electrolytes, which present ionic conductivity, and the solvent whereof is an ethylene polyoxide or an ethylene oxide polymer, are described, for example, in EP-A 13199 (M. Armand, M. Duclot). These polymeric electrolytes have numerous applications, in particular, in the field of electrochemical generators, light modulation systems (M. Armand et al., EP 87401555), sensors, for example, for selective or reference membranes (A. Hammou et al., FR 86.09602).

Also known are materials which present a mixed conduction, i.e., in which there is a simultaneous movement of ions and electrons. These materials may be so-called insertion materials, among which, we can cite the materials formed by dissolving lithium in a disulfide, for example, titanium disulfide, or in an oxide, for example, vanadium oxides, $VO_x$ ($x \geq 2.1$) and the manganese oxides. Such materials are worthwhile as electrode materials. The energy that they allow to be stored per unit mass is significant, but their kinetics and their power may be limiting factors. Furthermore, they can be destroyed by an overload or excessive discharge.

Mixed conductivity in heterogeneous phases is obtained by dispersion of conductive particles, such as carbon blacks, in polymers, for example, by dispersion of carbon black in ionic conduction polymers. These mixtures are used particularly in electrochemical generators so as to obtain a good exchange of ions and electrons with electrode materials, such as the insertion compounds. It is, nonetheless, difficult in the mixtures to provide complete percolation at the microscopic level. In particular, the carbon blacks significantly increase the viscosity of the compounds, the consequence of which is a poor moistening of the grains of electrode material and the existence of residual porosity which increases the apparent resistance of the environment.

Polymers are also known which possess conjugated $\pi$-bonds and which essentially present electron conductivity. The become conductors after the insertion of ionic, anionic or cationic spaces which compensate for the loss or the gain of electrons of the $\pi$-orbital network. These materials possess a metallic-type conductivity, and they do not constitute solvents. The mobility of the ionic species which serve to compensate for the charges is very weak because of the rigidity of the polymeric network. Moreover, the shaping of these materials is difficult by reason of the infusible and general insoluble nature.

Through Watanabe M., et al., Electrochimica Acta 37, No. 9, 1521 (1992), mixed conduction materials are known, obtained either by dissolving $LiClO_4$ and LiTCNQ in an ethylene polyoxide, or by radical copolymerization of vinylferrocene and acrylic esters of oligoethylene glycol. The statistical copolymers obtained are a reduced domain of chemical and electrochemical stability and the only usable redox molecules are active redox molecules in radical polymerization, which considerably limits the choice of materials. Furthermore, the structure of the comb-type polymer obtained hardly allows the units bearing redox functions to form a stack favorable to electron exchange.

Through EP-A 0,033,015, polymers consisting of naphthalene diimide units linked by segments comprising from 0 to 3 alkylene oxide units, or of segments comprising from 1 to 5 alkyleneimine units, with the alkylene having, in both these cases, from 1 to 4 carbon atoms, are known. Such polymers present good electron conductivity because the alkylene or alkyleneimine oxide segments permit the stacking of the redox functions. However, the bond segments are too short to confer to the polymer the solvating properties which are necessary to confer to it ionic conduction properties.

The purpose of the present invention is to provide macromolecular materials presenting at the same time good mixed conduction properties and good mechanical properties.

To this end, the object of the present invention are copolymers.

Another object of the invention is also mixed conduction materials of which the solvent essentially consists of at least one of the aforementioned copolymers.

Lastly, the object of the invention is different applications of the aforesaid copolymers and the aforesaid mixed conduction materials.

A copolymer according to the present invention is a segmented copolymer consisting essentially of identical or different organic segments A, which have a number i of reactive ends such that i is from 1 to 6 inclusive, and by identical or different segments B, which have a number j of reactive ends such that j is from 1 to 6 inclusive, characterized by the fact that the segments B present redox properties, by the fact that the segments A are chosen among the nonsolvating segments, such as alkylene or polyalkylene segments and polysiloxane segments, and the solvating segments, by the fact that each segment A is linked to at least one segment B by a group Y and each segment B is linked to at least one segment A by a group Y, which group Y is chosen from among ether groups, thioether groups, secondary amine groups, tertiary amine groups, imide groups, quaternary ammonium groups and groups having a carbon—carbon bond, and by the fact that the weighted molar average of i and the weighted molar average of j are each greater than or equal to 2.

The segment B contains at least one unit derived from an aromatic molecule that can easily form stable anionic or cationic radical species by the loss or gain of at least one electron. Among the particularly appropriate units derived from an aromatic molecule, we can cite aromatic tetracarboxylic diimide groups, for example, the pyromellitic diimide group, the benzophenonetetracarboxylic diimide group, the 1,4,5,8-naphthalenetetracarboxylic diimide group or the 3,4,9,10-perylenetetracarboxylic diimide group. The quaternary aromatic dications may also be cited, for example, 4,4'-dipyridinium or trans-1,2-bis(pyridinium)ethylene. There may also be cited the substituted aromatic diamine groups, for example, the 1,4-phenylene diamine group or the 4,4'-stilbenediamine group. Furthermore, the condensed ring alkyldiarylamine groups, for example, the 9,10-dicarbylphenazine group or the N,N'-bisacridine group. Finally, the groups derived from aromatic hydrocarbon groups may be cited, for example, 9,10-bis(methylene) anthracene and the metallocenediyls, for example, 1,1'-ferrocenediyl.

It is understood that the usable segments B are not limited to the examples given above, but they also be chosen from among their homologues, obtained by the substitution of hydrogen atoms by carbonaceous groups or by insertion of carbonaceous groups among the redox groups which make it possible to maintain the conjugation of the electron system or yet by replacement of hydrocarbon groups with heteroatoms (for example, the replacement of HC≡ with N≡).

The formulas of the particular groups B mentioned above are given below:

① diimido pyromellitique
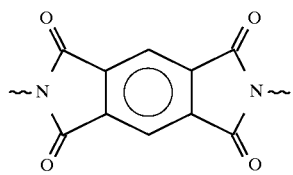
② diimido benzophénone-tetracarboxylique
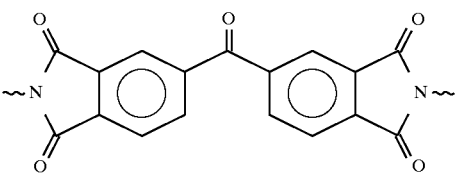
③ diimido 1,4,5,8 naphtalène tetracarboxylique
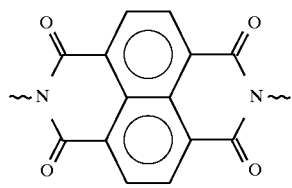
④ diimido 3,4,9,10 perylène tetracarboxylique
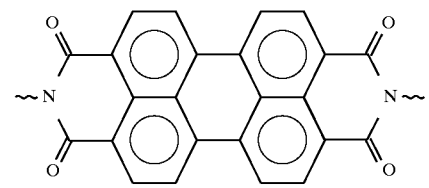
⑤ 4,4' dipyridiniun-(viologène)
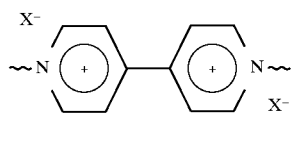
⑥ trans 1,2 bis-ethylene(4-pyridinium)-
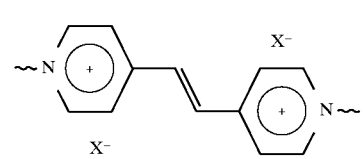
⑦ 1,4 phenylène-diamino
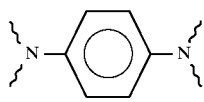
⑧ stilbène 4,4'-diamino
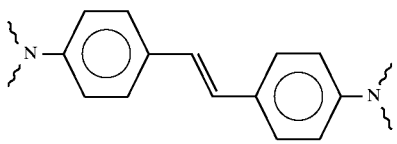
⑨ 9,10-di(N,N'-carbyl)-phenazino
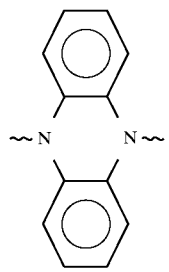
⑩ di(N,N'-carbyl)-bis-acridino
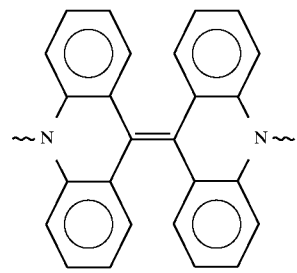
⑪ 9,10 bis(methylène)anthracène
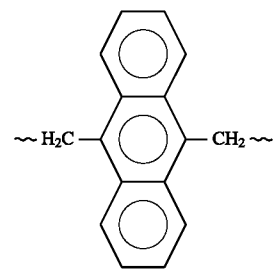
⑫ 1,1' ferrocène-di-yl
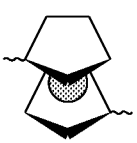

| Key: | 1  | Pyromellitic diimide |
|------|----|---|
|      | 2  | Benzophenonetetracarboxylic diimide |
|      | 3  | 1,4,5,8-Naphthalenetetracarboxylic diimide |
|      | 4  | 3,4,9,10-Perylenetetracarboxylic diimide |
|      | 5  | 4,4'-Dipyridinium(viologen) |
|      | 6  | trans-1,2-Bisethylene(4-pyridinium) |
|      | 7  | 1,4-Phenylenediamine |
|      | 8  | Stilbene-4,4-diamine |
|      | 9  | 9,10-Di(N,N'-carbyl)phenazine |
|      | 10 | Di(N,N'-carbyl)bisacridine |
|      | 11 | 9,10-Bis(methylene)anthracene |
|      | 12 | 1,1'-Ferrocenediyl |

Among the solvating segments appropriate for A, the homopolymers of ethylene oxide or propylene oxide may be cited. Ethylene oxide copolymers and propylene oxide may also be cited, and ethylene oxide or propylene oxide copolymers with comonomers polymerizable by the formation of ether bonds may also be cited. The comonomer may be chosen from among oxymethylene, oxetane, tetrahydrofuran, methyl glycidyl ether and dioxolane. Among the copolymers, those containing at least 70 mol % units derived from ethylene oxide or propylene oxide are particularly preferred. The solvating segments may also be chosen from among the polyimines.

In order for the homopolymers and the copolymers mentioned above as a solvating segment A to be able to present effectively ionic conduction properties arising from solvating properties, it is necessary for at least certain ones from among the segments A of polymer to comprise an adequate number of solvating units to surround a cation based on its coordination number. This number of solvating units increases, in particular, with the diameter of the ion to be solvated and the space occupied by the redox segment B present. The determination of the number of solvating units that should be carried by a segment A to provide the necessary solvation to confer to the polymer adequate ionic conduction is within the understanding of a person familiar with the field. Adequate ionic conduction is understood to mean conduction that is at least $10^{-8}$ S.cm$^{-1}$ at room temperature. By way of illustration, for a redox segment of the pyromellitic diimide type, the number of solvating units of the ether type should be at least 3; for a redox segment of the perylenetetracarboxylic diimide type, the number of solvating units of the ether type should be at least 8; for a redox segment of the naphthalenetetracarboxylic diimide type, the number of solvating units of the ether type should be at least 5. In the continuation of the text, "solvating segment" will be understood to mean the segments meeting these conditions, and especially making it possible to obtain ionic conductivity at least equal to $10^{-8}$ S.cm$^{-1}$ at room temperature.

The segments A may furthermore comprise a function that makes it possible to form a network. By way of example of such a function, the functions that permit crosslinking by radical means, crosslinking of the Diels Alder type or polycondensation, for example, by hydrolysis of an alkoxysilane function. These particular segments A shall be designated below as segments A'.

In a copolymer of the present invention, a part of the nonsolvating segments A may also be replaced by nonsolvating segments A" of the arylene or alkylarylene type, when there is a desire to increase the interactions among the redox units B.

An advantage of the copolymers of the present invention is that they can be obtained by polycondensation procedures based on relatively easily implemented chemical reactions, which depend on the nature of the group Y serving as a link between one segment A and one segment B.

Generally speaking, a copolymer of the present invention is obtained by causing at least one compound $AZ_i$ to react with at least one compound $BX_j$, or at least one compound $AX_i$ to react with at least one compound $BZ_j$, with A, i, B and j having the meanings given them above, with the groups Z and X chosen according to the group Y desired and the relative proportions of the different groups $AZ_i$ (or $AX_i$) being such that the ratio of the number of radicals Z (or X) to the number of segments A is at least equal to 2, the relative proportions of the different groups $BX_j$ ($BZ_j$) being such that the ratio of the number of radicals X (or Z) to the number of segments B is at least equal to 2.

In a particular embodiment, X is a leaving group and Z is a nucleophilic group.

The leaving group X may be a halide, more particularly, a chloride, a bromide or an iodide, or else a sulfate R'OSO$_3$ or a sulfonate R'SO$_3$ in which R' represents an organic group having less than 20 carbon atoms. Preferably, R' represents an alkyl group, an aryl group, an alkylaryl group, while these groups may likewise be halogens. The leaving group may likewise be generated by an anhydride group, a diacid group or a monoacid group. The leaving group may furthermore be generated by an onium salt, for example, by a diphenylpyridinium salt.

A bonding group Y of the ether or thioether type may be obtained from a nucleophilic group Z chosen respectively from among the —OM or —SM groups (M representing an alkali metal).

A bonding group Y of the imide type may be obtained by the reaction of a leaving group X generated by an acid anhydride with a nucleophilic group Z which is an amine, followed by dehydration. It may also be obtained by a transimidification procedure starting with an aromatic molecule containing i imide groups by reaction with an A(NH)$_i$ compound. In addition, a diimide bonding group may be obtained by the reaction of an amine with a diacid, or by the reaction of a compound $AX_i$ with an alkali salt of a compound $BZ_j$, in which Z represents an imide function.

A bonding group of the secondary amine type may be obtained by the reaction of a leaving group with a primary amine nucleophilic group.

A bonding group of the tertiary amine type may be obtained by the reaction of a leaving group with a secondary amine nucleophilic group.

A bonding group of the secondary amide type may be obtained by the reaction of a leaving group with a primary amide nucleophilic group.

A bonding group of the teritary amide type may be obtained by the reaction of a leaving group with a secondary amide nucleophilic group.

A bonding group of the quaternary ammonium type may be obtained by the reaction of a leaving group with a nucleophilic group of the tertiary amine type.

When the group Y is a carbon—carbon bond, the copolymer may be obtained by the reaction of a precursor organometallic compound of the segment A with a compound possessing a precursor leaving group of the segment B or conversely with the reaction being catalyzed by a coordination complex of a transition metal such as nickel or cobalt, with the coordination being provided by a phosphine.

The properties of a copolymer according to the present invention may be predetermined by the choice of the segments A and/or the segments B.

A copolymer according to the present invention may contain all identical segments A. It may likewise carry different segments A. The choice of the solvating segments A makes it possible to reduce, if not eliminate, the crystallinity of the copolymer and therefore improve its ionic conductivity. It may likewise improve its mechanical properties. The introduction of nonsolvating segments makes it possible to adapt certain properties of the copolymer, for example, its mechanical properties or the conductivity of the network; it also makes it possible to contribute new properties inherent in nonsolvating segments such as adhesiveness or to introduce chemical functions.

When, in view of the expected use for a copolymer of the present invention, it is desirable that the copolymer be able to form a network, two solutions are possible. Part of the segments A may be replaced with segments A' containing crosslinkable groups defined above. Part of the segments B may also be replaced with segments B' that do not present redox properties, but that contain groups that permit crosslinking. In both cases, this may involve radical crosslinking, crosslinking of the Diels Adler type, polycondensation, for example, by hydrolysis of an alkoxysilane function. For this purpose, when the copolymer is being prepared, some of the $BX_j$ molecules are replaced by $B'X_j$ molecules, in which B' is a radical with a valence j' and which does not possess any redox function but which possess crosslinkable functions, or else at least some of the $AZ_i$ molecules are replaced by $A'Z_i$ molecules which carry a crosslinkable function. The stoichometry of the reaction should then take into account all of the groups X and Z provided by the coreactants.

The copolymers obtained in this particular case consist of identical or different organic segments A, each with a valence i such that $1 \leq i \leq 6$, identical or different segments B, in each of which B represents an organic radical presenting redox properties, having a valence j such that $1 \leq j \leq 6$, and segments A' having a valence i' such that $1 \leq i' \leq 6$ or identical or different segments B' possessing at least one function that permits crosslinking having a valence j' such that $1 \leq j' \leq 6$;
- with each segment A or A' being linked to at least one segment $B_j$ or $B'_j$, by a function Y, with each segment B or B' linked to at least one segment A or A' by a function Y, with the function Y being such as defined previously;
- the weighted molar average of the valences i and i' of the segments A and A' and the weighted molar average of the valences j and j' of the set of radicals Z and Z' each being greater than or equal to about 2.

The copolymers of the present invention may be used as such or in a crosslinked form for the preparation of the mixed conduction materials.

The mixed conduction materials of the present invention essentially consist of an easily dissociable salt and copolymer according to the present invention.

When the degree of polycondensation of the copolymer according to the invention is adequate, the copolymer may be used as such for the preparation of a mixed conduction material. However, its implementation is not easy.

For the preparation of mixed conduction materials, copolymers with a relatively weak degree of polycondensation would be preferably used, such as those obtained from one or several $AZ_i$ compounds and one or several $BX_j$ compounds (and possibly one or several $A'Z_i$ or $B'X_j$ compounds) for which the weighted molar average is practically equal to 2 both for i (or i+i') and for j (or j+j'). Such copolymers will be crosslinked, after being formed, by means of the crosslinkable functions present in the segments A' and/or B'.

For the preparation of mixed conduction materials, it is necessary to use copolymers in which at least part of the segments A are solvating segments. The solvating segments A consisting of homopolymers of ethylene oxide or propylene oxide or a copolymer of ethylene oxide or propylene oxide and a comonomer polymerizable by the formation of ether bonds in which the comonomer represents at the most 30 mol % are particularly preferred. The ethylene oxide and propylene oxide copolymers are particularly worthwhile.

The salt introduced into the copolymer having crosslinking or in the crosslinked polymer is chosen from among the salts habitually used for solid ionic conduction materials. By way of example, the $(1/mM)^+X^{3-}$ salts may be cited, with M representing a proton, an ion of a metal with valence m, chosen from among the alkali metals, the alkaline-earth metals, the transition metals and rare earths, or the ammonium, amidinium or guanidinium ions; with $X^3$ representing an anion with a delocalized electron charge, for example, $Br^-$, $ClO_4^-$, $AsF_6^-$, $R_FSO_3^-$, $(R_FSO_2)_2N^-$, $(R_FSO_2)_3C^-$, with $R_F$ representing a perfluoroalkyl or perfluoroaryl group, particularly, a perfluoroalkyl or perfluoroaryl group having at the most 8 carbon atoms, more particularly $CF_3^-$ or $C_2F_5^-$.

The salt may also be chosen from among the salts responding to the formula $(1/nM)^+[(R_FSO_2)_2CY^1]^-$ in which $Y^1$ represents an electron-attracting group chosen from among $-C\equiv N$ and the groups $R''Z^1-$ in which $Z^1$ represents a carbonyl group, a sulfonyl group or a phosphonyl group and $R''$ represents a monovalent organic group, possibly possessing a function that is crosslinkable by radical means or by means of a Diels Alder reaction, with M and $R_F$ having the meaning given above. Such components may be prepared by the reaction of a compound $(1/nM)^+(R_FSO_2)_2CH]^-$ with a $Y^1X^1$ compound in the presence of a nucleophilic aprotic base Nu, with $X^1$ representing a halogen or a pseudohalogen. The lithium salts are particularly preferred, more particularly $(CF_3SO_2)_2N^-Li^+$ and $(CF_3SO_2)_3C^-Li^+$. Mixtures of salts may be used. These salts and their preparation procedure are described in FR 91.13789, filed Nov. 8, 1991.

A mixed conduction material of the present invention in which the copolymer according the invention is crosslinked is obtained by subjecting the copolymer to the action of heat or of energetic radiation such as ultraviolet radiation, γ-rays or an electron beam, possibly in the presence of a radical initiator. The radical initiator may be chosen, for example, from among benzoyl peroxide, azobisisobutyronitrile (AIBN), azobiscyanovaleric acid, dicumyl peroxide (Dicup) or the disulfides, for example, 3,3'-dithiodipropionic acid. The salts $(1/nM)^+[(R_FSO_2)_2CY^1]^-$ defined above, in which $Y^1$ contains a source of free radicals, may be used as radical initiators. The radical initiator is not necessary when the crosslinking is done by means of a Diels Alder reaction.

In a first embodiment, a mixed conduction material is obtained by dissolving the copolymer, the salt and possibly a radical initiator in a common solvent. The amount of initiator used is advantageously from 0.1 to 5 wt % in relation to the copolymer. The solvent is chosen from among the volatile solvents; as an example of such a solvent, acetonitrile, tetrahydrofuran and acetone may be cited. The viscous solution obtained is degassed, then spread over an appropriate support, for example, a PTFE plate. After the solvent is evaporated, the film obtained is taken to a temperature of between 70° C. and 120° C., depending on the initiator used, for 4 h.

In another method of crosslinking, the crosslinking of the copolymer is done first, in the absence of salt, and then a membrane is prepared. The salt is then introduced into the membrane in the following way: a very concentrated solution of the salt is made in a volatile polar solvent; it is made to be absorbed by the membrane, then the solvent is evaporated. The amount of salt introduced is determined by the difference between the initial weight of the membrane and its final weight.

In a third embodiment, the crosslinking of a copolymer of the present invention is made with the aid of a radical polymerization initiator in the presence of a monomer carrying an ionic group and group that is crosslinkable by means of a radical mechanism. Examples of such monomers are described in FR 92.02027, filed Feb. 21, 1992.

Of course, the mixed conduction materials of the present invention may also contain additives habitually used in ionic conduction materials, such as plasticizers, and stabilizers, according to the final properties sought.

The mixed conduction materials of the present invention may be easily prepared, and their implementation is easy because of their good solubility before crosslinking when the respective weighted molar averages of i and j are not greater than about 2.

A material obtained from a copolymer of the present invention, by virtue of the redox activity coupled with good ionic conductivity, may be advantageously used as an active component of an electrode for entirely solid generators or for generators whose electrolyte is either plasticized or in the form of a gel consisting of a polymer and a liquid solvent. When such a material is used in a mixture with an insertion compound, the rapid electron-exchange kinetics enables it to replace entirely or partially the agent serving to ensure the electron conductivity, in particular, carbon black. Moreover, it makes it possible to have a capacity reserve and, especially, of power for this type of generator. This possibility is particularly advantageous when the material of the invention is used in a positive electrode by choosing a copolymer with a redox coupling potential slightly lower than that of the insertion material. Under these conditions, the redox copolymer recovers its initial capacity after the end of the power demand.

The materials containing the copolymers of the present invention, in addition, make it possible to improve the function of the electrochemical generators and to prevent their premature degradation. The incorporation in at least one of their electrodes of a redox copolymer whose potential is suitably chosen makes it possible to indicate by the reading of the electromotive force the end of the charging or discharging process before degradation of the system occurs. Similarly, the utilization of a copolymer of the present invention in a composite electrode makes it possible to modulate the window of potential in which the electron exchanges can take place. Advantageously, the mixed conduction material contains a copolymer according to the present invention chosen so as to lose its electron conductivity at the end of the recharging of the insertion material contained in the composite electrode.

In the materials of the present invention, the injection (reduction) or the extraction (oxidation) of electrons is accompanied by a change in color. This property allows their use for the negative electrode of a light modulation device, in particular, for electrochromic panes of glass or coatings. The film-forming nature of the copolymers of the present invention is particularly advantageous for their implementation for this particular application. The different segments constituting the copolymer may be chosen in such a way that the copolymer can be crosslinked or polycondensed after being shaped, and that it presents a adherence to the support (generally glass or an oxide layer) by sizing.

Finally, because of their electron conductivity, the mixed conduction materials of the present invention may advantageously be used for the elimination of static electric charges.

The present invention is illustrated by the following examples given as nonlimiting illustrations.

EXAMPLE 1

21.8 g of pyromellitic anhydride and 63.5 g of O,O'-bis (2-aminopropyl)poly(oxyethylene 500) (Jeffamine® ED600) marketed by the Texaco company, are dissolved in 200 mL of a mixture of equal volume of pyridine and acetonitrile. The mixture is stirred at room temperature for 5 h, during which period the polyaminic acid forms by the action of the amine functions on the cyclic anhydride functions. To the mixture are then added 50 mL of acetic anhydride which enables the acid amide functions to transform into imide rings. The stirring is continued for 2 h. The resultant polymer is precipitated by pouring the reaction mixture into 800 mL of diethyl ether kept at −10° C. The polymer is purified by three dissolving operations in the acetone and precipitation in the ether at −10° C.

EXAMPLE 2

4.4 g of ethylene polyoxide of a molecular mass of $9 \cdot 10^5$ are dissolved in 80 mL of anhydrous dichloromethane; the operation is carried out in a glove box under an argon atmosphere containing $\leq 1$ vpm [sic; possibly, ppm] of oxygen and water vapor. The solution is cooled down to −15° C. and, while stirring, a solution of 1.87 mL of trifluoromethanesulfonic anhydride is added into 10 mL of hexane. A cut-off reaction occurs to form a triflate ester of oligooxyethylene glycol of an average mass of 900. 1.73 g of 4,4'-dipyridyl in solution with 10 mL of dichloromethane are added to the reaction mixture. The stirring is kept up at −15° C. for 2 h and the reactor is allowed to return to room temperature. The stirring is continued for 8 h. The solvent (dichloromethane+hexane) is partially eliminated with the aid of a rotary evaporator to leave a turbid suspension of around 30 mL. The polymer is precipitated by anhydrous ether and purified by means of 4 dissolution/precipitation cycles in the solvent pair acetonitrile/nonsolvent: ether.

EXAMPLE 3

3.92 g of 3,4,9,10-perylenetetracarboxylic anhydride and 6.35 g of O,O'-bis(2-aminopropyl)poly(oxyethylene 800) (Jeffamine® ED900) marketed by the Texaco company are dissolved in 30 mL of dimethylacetamide. In a reactor equipped with mechanical stirring, the mixture is taken to 160° C. under argon for 3 h. The resulting red polymer is precipitated by pouring the reaction mixture into 200 mL of a diethyl ether/hexane mixture. It is then purified by ultrafiltration in water by using a membrane whose cutoff mass is Mw=5,000. The electroactivity of this material is verified by microelectrode voltmeter technique. The electrochemical chain is as follows:

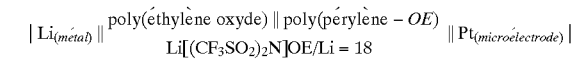

Key: 1 Poly(ethylene oxide)

The rapid and reversible nature of the injection of electrons at $E_0$=2.6 and 2.4 V/Li:Li$^0$ into the material is shown. This polymer presents, additionally, marked electrochromic properties, going from ruby red in the neutral state to dark violet after reduction.

EXAMPLE 4

This example illustrates the possibility of preparing the polymer by a transimidification procedure: 27 g of 1,4,5,8- naphthalenetetracarboxylic anhydride are treated with 17 mL of propylamine in 50 mL of pyridine. After a reaction forming acid amide by opening the anhydride rings, 25 mL of acetic anhydride are added. The N,N'-bispropylnaphthalenetetracarboximide is precipitated by the water and purified by recrystallization from ethanol.

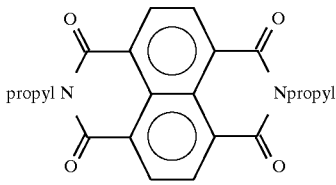

To 19.32 g of imide are added 42.5 g of O,O'-bis-2 (aminopropyl)poly(oxyethylene 800) (Jeffamine® ED900) and 2.2 g of the dianhydride of bicyclo[2.2.2]oct-7-ene-2,3,5,6-tetracarboxylic acid (crosslinking agent) in 150 mL of anhydrous dimethylacetamide. In a reactor equipped with mechanical stirring, the mixture is taken to 160° C. while maintaining an argon flow for 3 h. The resulting brown-colored polymer is precipitated by adding the reaction mixture to anhydrous ether at −10° C. The material is purified by three successive operations of dissolution/precipitation in the solvents dichloromethane/ether. This polymer is crosslinkable by means of a radical procedure acting on the bicyclo[2.2.2]oct-7-ene-2,3,5,6-tetracarboxylic diimide groups.

EXAMPLE 5

15.62 g of 4,4'-dipyridyl, 26.2 g of itaconic acid and 100 mL of a 2M aqueous solution of trifluoromethanesulfonic acid are heated at reflux for 4 h. The solution is evaporated under reduced pressure, and the resulting solid is purified by recrystallization in isopropanol. Its structure is represented by:

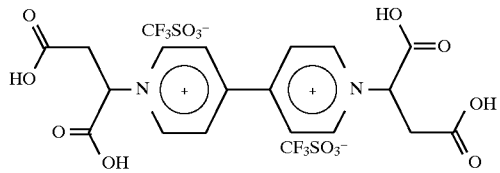

7.16 g of the preceding compound, 5.71 g of O,O'-bis(2-aminopropyl)poly(oxyethylene 500) (Jeffamine® ED600) and 0.207 g of bis(aminopropyl)dimethoxysilane are dissolved in 30 mL of dimethylformamide. 10 mL of pyridine and 5 g of dicyclohexylcarbodiimide are added. The mixture is stirred in an argon atmosphere for 30 h at room temperature. The main structure of the polymer formed is:

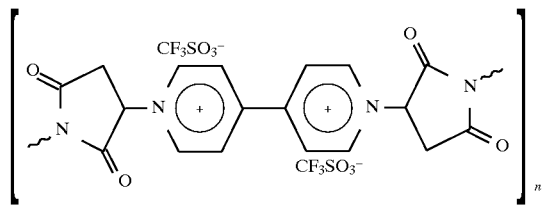

EXAMPLE 6

An electrochromic system of which a diagram of the structure is shown in FIG. 1 is constituted. The electrochemical system represented in FIG. 1 comprises a glass substrate (1), a zinc-doped oxide layer (2), a polymer layer (3), an electrolyte (4), a counter electrode (5), a layer of zinc oxide (6) and a glass substrate (7). 0.5 g of polymer of Example 6 is dissolved in 3 mL of dimethylformamide with 80 mg of lithium trifluoromethanesulfonate. The solution is deposited by spin coating so as to obtain a layer of 1 $\mu$m (3) on a flat glass substrate (1) previously covered by reactive cathodic spraying of a layer of 120 nm of aluminum-doped zinc oxide (2). The film (3) is crosslinked by air treatment at 60° C. for two hours. The counter electrode (5) consists of a 50:50 equimolar mixture of cerium oxide and titanium oxide deposited by the sol-gel procedure to form a 200-nm-thick layer above a layer (6) of zinc oxide similar to the layer (2) on glass (7). The mixed cerium/titanium oxide is reduced as a preliminary step by the electrochemical insertion of $5 \cdot 10^{-2}$ C of lithium. Both electrodes are separated by an electrolyte (4) obtained by polycondensation of the polyethylene glycol with a mass of 1,500 with the 2-chloromethyl-3-chloropropene and in which lithium bis(trifluoromethylsulfonyl) imide is present at the concentration of 1 mol of salt for 18 oxyethylene units.

The electrochromic system in which the redox polymer constitutes the negative electrode operates by the application of 1.5 V. A bluish coloration appears in a few seconds; it is stable in an open circuit and disappears by means by short-circuiting the electrodes. A similar device may be embodied by replacing the glass substrate with a PET-type polymer or polysulfone film.

EXAMPLE 7

25 g of α,ω-dibromooligooxyethylene are prepared from polyethylene glycol of mass 1,000 by action of an excess of thionyl bromide in acetonitrile in the presence of Amberlyst® A21 (Rohm & Haas) basic ion-exchange resin. The reaction mixture is filtered and the polymer is precipitated in ether cooled down to −10° C. The purification is likewise accomplished by dissolution/precipitation in the dichloromethane-ether pair. A study of molecular mass by steric exclusion chromatography and the determination of the halogen content (AgNO$_3$/AgBr) gives a functionality of 2 and an average mass M$_w$=1,035. 3.53 g of phenazine are dissolved in 15 mL of anhydrous THF, and 0.5 g of metallic lithium is added in an argon atmosphere. The mixture is stirred by means of a magnetic bar covered with polyethylene. After the reaction, there appears a yellow precipitate of the dianion salt. The excess metallic lithium is separated, and 14.49 g of the α,ω-dibromooligooxyethylene prepared previously are added; the mixture is stirred at room temperature for 20 h, and the reaction product is precipitated in ether. The polymer obtained is purified in water with the aid of an ultrafiltration membrane with a cutoff of M$_w$=5,000. The water is evaporated and a brown-green colored polymer is obtained. The complex formed by dissolution of the lithium bis(trifluoromethylsulfonyl)imide presents a reversible redox activity at +3.5 V/Li:Li$^0$.

EXAMPLE 8

525 mg of α,ω-bis(aminopropyl)poly(tetrahydrofuran) 750 are dissolved in the acetonitrile, and 640 mg of triphenylpyrilium trifluoromethylsulfonate are added. The formation of the α,ω-bis(triphenylpyridiniumpropyl) polytetrahydrofuran trifluoromethylsulfonate 750 is instantaneous. The polymer is precipitated by the water and then dried in a vacuum at 40° C. 0.832 g of this material is dissolved in 5 mL of anhydrous THF and added to 194 mg of dilithiophenazine, just as prepared in Example 7. The resulting polymer is precipitated by the water and purified by dissolution/precipitation in the solvent pairs of THF/water and then dichloromethane/ether. After drying, an elastomer is obtained presenting, like that of Example 7, redox properties with oxidation appearing between 3.2 and 3.6 V/Li:Li$^0$.

EXAMPLE 9

An electrochemical generator consists of a negative metallic lithium electrode with a thickness of 18 μm, laminated on a current collector made of polypropylene (8 μm) metallized with 150 nm of molybdenum. The electrolyte consists of a copolymer of ethylene oxide and allyl glycidyl ether, which permits crosslinking, in the form of a 40-μm film and loaded with lithium bis(trifluoromethylsulfonyl) imide for an O:Li ratio of 14. The positive electrode contains 55 vol % of the polymer of Example 3 after dissolution of lithium bis(trifluoromethylsulfonyl)imide at a concentration of 1 mol of salt for 14 oxyethylene units, 40% lithium manganite $Li_{0.2}Mn_2O_4$ and 5% of Ketjenblack® (AKZO Chemicals) carbon black. The composite material is dispersed and ground in the acetonitrile and spread on a current collector identical to that of the negative electrode so as to form a 95-μm-thick film. The electrochemical system is assembled by laminating. The use of a positive electrode mixed conduction polymer makes it possible to obtain high electric potentials for several tens of seconds (J=2 mAcm$^{-2}$ for V=2.5 V at 60° C.), with the kinetics of forming radical anions inside the polymer being faster than that corresponding to the diffusion of lithium ions in the insertion material. The electron conductivity makes it possible, moreover, to reduce the proportion of carbon in the composite, with the advantage residing in the weight and absence of porosity in the film.

EXAMPLE 10

7 g of poly(oxyethylene) glycol of a mass of 1,000 are dehydrated by the action of 1 mL of 2,2-dimethoxypropane and evaporation of the excess reagent and the reaction products in a vacuum. The polymer is dissolved in 40 mL of anhydrous THF and 350 mg of sodium hydride are added to it. After the end of the reaction, observable by the cessation of the discharge of hydrogen, 2.75 g of bis (9,10-dichloromethyl) anthracene are added. A precipitate of sodium chloride is immediately observed. After completion of the reaction in several hours, the suspension is centrifuged, and the supernatant is precipitated in the cold ether. The polymer is purified by ultrafiltration in water by using a membrane with a cutoff of 5,000. After the solvent is evaporated, a supple material presenting a redox activity at +1.4 V/Li:Li$^0$ is obtained with the formation of polymeric radical anion anth·$^-$ and at +3.4 V/Li:Li$^0$ with the formation of polymeric radical cation anth·$^+$.

EXAMPLE 11

The lithium salt of 1,1'-bismercaptoferrocene is prepared according to the procedure of F. Brandt and T. Rauchfuss (J. Am. Chem. Soc. 114, 1926 (1992)); 12 mmol of this salt in anhydrous THF are treated with 13.2 g of α,ω-dibromooligooxyethylene prepared from polyethylene glycol of a mass of 1,000 according to Example 7. The mixture is stirred at 60° C. for 3 h. The polymer obtained is eluted in a column containing a mixture of macroporous ion-exchange resins (cationic and anionic) in order to eliminate the lithium bromide formed. The polymer is precipitated by the ether and purified by dissolution/precipitation (dichloromethane/ether). The material presents a redox activity at +3.5 V/Li:Li$^0$.

EXAMPLE 12

2 g of Jeffamine® ED2000 and 0.55 g of soccerballene (buckminsterfullerene) $C_{60}$, marketed by Aldrich, are mixed from their solutions in toluene. The solution is poured into a glass ring (diameter=40 mm) deposited on a polished PTFE plate. After several hours, the solution gels. By evaporation of the solvent, a dark yellow elastic solid is obtained that presents a redox activity at +2.4 V/Li:Li$^0$.

EXAMPLE 13

An electrochemical generator is constituted according to Example 9. The composition of the positive electrode is modified to contain 55 volt of the polymer of Example 7 after dissolving lithium bis (trifluoromethylsulfonyl) imide at a concentration of 1 mol of salt for 18 oxyethylene units, and 45% lithium cobaltite $Li_{0.3}CoO_2$. The discharge curve of this generator shows that the discharge kinetics below the potential of $E_{limit}$=3.4 V is very slow because of the disappearance of the electron conductivity of the redox polymer. The kinetics is maximum in the potential zone of 3.5–3.7 V.

EXAMPLE 14

An electrochemical generator includes a polymeric electrolyte according to Example 9. Both electrodes are symmetrical and consist of a film of the polymer of Example 8 with a thickness of 10 μm, loaded with potassium trifluoromethanesulfonate deposited on current collectors made of polypropylene (8 μm) metallized on 20 nm of nickel. The generator is assembled by lamination. It presents a capacity of 0.05 C/cm$^2$ for a voltage of 2 V, with very rapid kinetics. This type of generator is usable as "supercapacity" to furnish or store high instantaneous electrical powers.

We claim:

1. A segmented copolymer consisting essentially of identical or different organic segments A which have a functionality i such that 1≦i≦6 and by identical or different segments B which have a functionality j such that 1≦j≦6, wherein the segments B present redox properties and contain at least one unit derived from an aromatic molecule which can form stable anionic or cationic radical species and said segments B are one or more members selected from the group consisting of aromatic tetracarboxylic diimide groups, the segments A are selected from the group consisting of solvating segments having a number of solvating ether units of at least 5, and wherein segments A optionally include nonsolvating segments or are optionally replaced in part by segments A' containing a group that permits the formation of a network, each segment A is linked to at least one segment B by a group Y and each segment B is linked to at least one segment A by a group Y, with the group Y being selected from the group consisting of ether groups, thioether groups, secondary amine groups, tertiary amine groups, secondary amide groups, tertiary amide groups, imide groups, quaternary ammonium groups, and groups containing a —CH$_2$—CH$_2$— bond, and wherein the weighted molar average of i and the weighted molar average of j are each greater than or equal to 2.

2. A copolymer according to claim 1, wherein said solvating segments are selected from the group consisting of homopolymers of ethylene oxide or propylene oxide, the copolymers of ethylene oxide and propylene oxide, and the copolymers of ethylene oxide or propylene oxide with a comonomer polymerizable by the formation of ether bonds.

3. A copolymer according to claim 2, wherein the comonomer polymerizable by formation of ether bonds is a member selected from the group consisting of oxymethylene, oxetane, tetrahydrofuran, methyl glycidyl ether and dioxolane.

4. A copolymer according to claim 1, wherein at least one part of the segments A are nonsolvating segments selected from the group consisting of arylene radicals and arylalkylene radicals.

5. A copolymer according to claim 1, wherein at least a portion of the segments A are replaced by segments A' containing a group that permits the formation of a network and/or part of the segments B are replaced with segments B' not containing any redox function, but containing a group permitting the formation of a network.

6. The copolymer of claim 1, wherein said segments A are polyethylene oxide segments and said segments B are derived from pyromellitic diimide and said copolymer has an ionic conductivity of at least $10^{-8}$ S.cm$^{-1}$.

7. A material containing a salt and a polymeric solid solvent, wherein the polymeric solvent consists essentially of at least one segmented copolymer consisting of identical or different organic segments A which have a functionality i such that $1 \leq i \leq 6$, and by identical or different segments B which have a functionality j such that $1 \leq j \leq 6$, in which copolymer segments B present redox properties and contain at least one unit derived from an aromatic molecule which can form stable anionic or cationic radical species and said segments B are one or more members selected from the group consisting of aromatic tetracarboxylic diimide groups, the segments A are selected from the groups consisting of solvating segments having a number of solvating ether units of at least 5, each segment A is linked to at least one segment B by a group Y, and each segment B is linked to at least one segment A by a group Y, with the group Y being selected from the group consisting of ether groups, thioether groups, secondary amine groups, tertiary amine groups, secondary amide groups, quaternary ammonium groups, and groups containing a —CH$_2$—CH$_2$— bond, and the weighted molar average of i and the weighted molar average of j are each greater than or equal to 2.

8. A material according to claim 7, wherein the copolymer is crosslinked.

9. A material according to claim 4, wherein the salt is selected from the group consisting of salts M$^{m+}$m(X$^3$), with M representing a proton, an ion of a metal with the valence m, selected from the group consisting of alkali metals, alkaline-earth metals, transition metals, rare earth weighted molar average of i and the weighted molar average of j are each greater than or equal to 2.

10. A material according to claim 9, wherein X$^3$ is Br, ClO$_4^-$, AsF$_6^-$, R$_F$SO$_3^-$, (R$_F$SO$_2$)$_3$C$^-$ or (R$_F$SO$_2$)$_2$CY$^{1-}$, with R$_F$ representing a perfluoroalkyl or perfluoroaryl group and Y$^1$ representing an electron-attracting group.

11. An electrochemical generator including a polymeric solid electrolyte or a plasticized electrolyte, or an electrolyte in the form of a gel consisting of a polymer and liquid solvent, wherein at least one of its electrodes contains a segmented copolymer consisting of identical or different organic segments A which have a functionality i such that $1 \leq i \leq 6$, and by identical or different segments B which have a functionality j such that $1 \leq j \leq 6$, with the segments B presenting redox properties and containing at least one unit derived from an aromatic molecule that can form stable anionic and cationic radical species by the loss or gain of at least one electron and said segments B are one or more members selected from the group consisting of aromatic tetracarboxylic diimide groups, the segments A being selected from the group consisting of solvating segments having a member of solvating ether units of at least 5, each segment A being linked to at least one segment B by a group Y, and each segment B being linked to at least one segment A by a group Y, with the group Y being selected from the group consisting of ether groups, thioether gropes, secondary amine groups; tertiary amine groups, secondary amide groups, quaternary ammonium groups, and groups containing a —CH$_2$—CH$_2$— bond, and the weighted molar average of i and the weighted molar average of j are each greater than or equal to 2.

12. A light modulation device, having a negative electrode consisting essentially of a segment copolymer consisting essentially of identical and different organic segments A which have a functionality i such that $1 \leq i \leq 6$, with the segments B presenting redox properties and containing at least one unit derived from an aromatic molecule that can form stable anionic and cationic radical species by the loss or gain of at least one electron and said segments B are one or more members selected from the group consisting of aromatic tetracarboxylic diimide groups, the segments A being selected from the group consisting of solvating segments having a number of solvating ether units of at least 5, each segment A being linked to at least one segment B by a group Y, and each segment B being linked to at least one segment A by a group Y, with the group Y being selected from the group consisting of ether groups, thioether groups, secondary amine groups; tertiary amine groups, secondary amide groups, quaternary ammonium groups, and groups containing a —CH$_2$—CH$_2$— bond, and the weighted molar average of i and the weighted molar average of j are each greater than or equal to 2.

* * * * *

UNITED STATES PATENT AND TRADEMARK OFFICE
CERTIFICATE OF CORRECTION

PATENT NO. : 5,883,220

DATED : March 16, 1999

INVENTOR(S): Michel ARMAND, et al.

It is certified that an error appears in the above-identified patent and that said Letters Patent is hereby corrected as shown below:

On the title page, item [30] should be:

--[30]  Foreign Application Priority Data

Dec. 1, 1992 [FR] France ................. 92.14475--

Signed and Sealed this

Twenty-eighth Day of March, 2000

Attest:

Q. TODD DICKINSON

Attesting Officer

Commissioner of Patents and Trademarks